United States Patent
Koski

(10) Patent No.: US 7,586,930 B2
(45) Date of Patent: Sep. 8, 2009

(54) MULTICAST DATA COMMUNICATION METHOD AND NETWORK

(75) Inventor: Eric Koski, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 794 days.

(21) Appl. No.: 11/125,915

(22) Filed: May 10, 2005

(65) Prior Publication Data

US 2006/0256740 A1 Nov. 16, 2006

(51) Int. Cl.
H04B 7/212 (2006.01)
(52) U.S. Cl. .................. 370/442; 370/312; 714/749
(58) Field of Classification Search .......... 370/241, 370/242, 252, 253, 321, 328, 336, 338, 347, 370/390, 395.4, 432, 442; 455/423, 426.1, 455/450, 452.1, 515, 517; 714/18, 748, 749
See application file for complete search history.

(56) References Cited

U.S. PATENT DOCUMENTS

| | | | | |
|---|---|---|---|---|
| 5,768,250 | A * | 6/1998 | Albrecht | 370/216 |
| 6,151,696 | A | 11/2000 | Miller et al. | 714/748 |
| 6,820,231 | B2 * | 11/2004 | Lee et al. | 714/781 |
| 2003/0012195 | A1 | 1/2003 | Ohkubo et al. | 370/390 |
| 2003/0227934 | A1 | 12/2003 | White et al. | 370/432 |
| 2004/0100896 | A1 * | 5/2004 | Vayanos et al. | 370/201 |
| 2004/0131084 | A1 * | 7/2004 | Bing et al. | 370/473 |
| 2006/0239237 | A1 * | 10/2006 | Tong et al. | 370/338 |
| 2007/0162810 | A1 * | 7/2007 | Sato et al. | 714/748 |
| 2007/0223425 | A1 * | 9/2007 | Masui et al. | 370/335 |

FOREIGN PATENT DOCUMENTS

WO 02/23792 3/2002

OTHER PUBLICATIONS

Yamauchi, "Reliable Multicast Over the Mobile Packet Radio Channel", Vehicular Tech. Conference on May 6, 1990, pp. 366-371; XP010003594.
Gupta et al., "Reliable Multicast MAC Protocol for Wireless LANs", IEEE Conference on Communications, New York, NY, vol. 1 of 5, pp. 93-97, XP010642722.
P_Mul Fgan/Fkie, "An Application Protocol for the Reliable Data Transfer over Multicast Subnetworks and Under EMCON Restrictions", Internet Engineering Task Force, Apr. 1999, XP015034565.
Hui Zhao et al., "New Go-Back-N Arq Protocols for Point-to-Multipoint Communications", IEICE Transactions on Communications, Communications Society, Tokyo, JP, vol. E77-B, No. 8 dated Aug. 1, 1994, pp. 1013-1022, XP000470653.

* cited by examiner

Primary Examiner—Ricky Ngo
Assistant Examiner—Kan Yuen
(74) Attorney, Agent, or Firm—Allen, Dyer, Doppelt, Milbrth & Gilchrist, P.A.

(57) ABSTRACT

The communication method and system include wirelessly transmitting a data packet from a first node to a plurality of second nodes to define a wireless multicast transmission. Each second node determines whether the data packet was received with errors and if so transmits a negative acknowledgement (NAK) to the first node in a common allocated NAK time slot for the second nodes. The first node retransmits the data packet to the second nodes based upon receiving the NAK from any second node. The method and system may include measuring propagation delay between the first node and each of the plurality of second nodes, or measuring a maximum propagation delay between the first node and the plurality of second nodes, to determine the common allocated NAK time slot.

21 Claims, 4 Drawing Sheets

MULTICAST DATA COMMUNICATION METHOD AND NETWORK

FIELD OF THE INVENTION

The present invention relates to the field of communications, and, more particularly, to wireless multicast data communication and related methods.

BACKGROUND OF THE INVENTION

In communication systems and methods, messages or data from a sender to a receiver using a communication link are sometimes subject to sending errors, such as bit errors, delay, reordering, and duplication. For example, noise on the communication link can cause bits within messages to be incorrect, generally causing the receiver to be unable to use the message. In a wireless communication system, these problems are increased by circumstances such as co-channel interference, multipath and multipoint effects, such as refraction or reflection resulting in intrasymbol interference and intersymbol interference. These problems can substantially reduce the reliability of wireless communication links.

Automatic retransmission protocols are conventionally used between sender and receiver, so that the receiver positively acknowledges (ACK) or negatively acknowledges (NAK) messages from the sender, and the sender re-transmits those messages not acknowledged by the receiver within a reasonable time. Automatic retransmission and error recovery protocols, such as Automatic Repeat reQuest (ARQ) and hybrid-ARQ (i.e. ARQ with Forward Error Correction (FEC)), are known for packet-based communication.

The constantly varying quality of many wireless communication channels makes ARQ a highly desirable element of wireless data transfer mechanisms. Some attempts have been made to provide ARQ functionality in wireless multicast traffic delivery. Mil-Std-188-184 requires that each forward transmission be followed by a round-robin series of ACK/NAK transmissions from the receiving stations, transmitted one recipient at a time. The P-MUL (ACP142) protocol defers transmission of ACKs or NAKs until the entire traffic payload has been transmitted. Then, each recipient transmits a succession of ACKs and NAKs of the packets contained in the transmission. No explicit provision to prevent collisions of ACKs and NAKs transmitted by different recipients is included; the P-MUL protocol specification merely suggests delaying each ACK transmission by a randomly-determined period of time.

Users have found the multicast capability of MIL-Std-188-184 very slow and inefficient; as a result, it is not commonly used. The inefficient acknowledgment procedure for P-MUL and the lack of adaptability of transmission characteristics to channel conditions place limits on the level of performance this technique can achieve.

The NATO standard STANAG 4538 describes a pair of data link protocols HDL (High throughput Data Link) and LDL (Low latency Data Link), used for efficient point-to-point multipoint (multicast or broadcast) data transfer. Performance of the HDL and LDL protocols is enhanced through their use of a hybrid-ARQ (incremental redundancy) technique, in which if a packet is received with errors, the received channel symbols from receipt of the packet are retained; the receiving station requests retransmission of the corrupted packet; if the retransmitted packet still contains errors its symbols are combined with those retained from the prior transmission; as a result of the combining of symbols, it is often possible to recover the transmitted packet without errors.

U.S. Patent Application No. 2003/0227934 to White et al. describes a conventional multicast ARQ scheme for ad hoc networks where retransmissions can be multicast or unicast. This approach is similar to the Mil-Std-188-184 Multicast ARQ scheme. U.S. Pat. No. 6,151,696 to Miller, et al. describes a NAK-only multicast data transfer with ARQ.

U.S. Patent Application No. 2003/0012195 to Ohkubo et al. is directed to a multicasting system, in which the base station judges whether a received signal indicates a retransmission request according to the quality of the received signal, and retransmits a multicast signal corresponding to the retransmission request based thereon. In addition, the base station monitors a receiving state of a multicast signal in the mobile stations, and changes a transmission method to conform to the receiving state according to a result of monitoring, and sends a multicast signal. Only negative acknowledgements (NAKs) are used, and NAKs from multiple recipients can coincide or overlap in time through use of spread NAK waveform. Different recipients transmit different NAKs using different spreading codes, so that recipient identity can be recovered (e.g. from NAK received with highest power and/or quality).

As a result of increases in High Frequency (HF) network communications capacity, use of HF for delivery of IP network traffic is becoming useful and practical for many users. A major unmet challenge is that of providing an effective capability for delivering multicast data traffic (from one sender to multiple recipients) over HF channels. Lack of such capabilities is frequently an obstacle to using HF as a bearer medium for certain applications. Accordingly, there is a need for an efficient multicast data transmission protocol over wireless media such as HF radio.

SUMMARY OF THE INVENTION

In view of the foregoing background, it is therefore an object of the present invention to provide an efficient multicast data transmission method and network.

This and other objects, features, and advantages in accordance with the present invention are provided by a communication method including wirelessly transmitting a data packet from a first node to a plurality of second nodes to define a wireless multicast transmission. The method includes at each second node determining whether the data packet was received with errors and if so transmitting a negative acknowledgement (NAK) to the first node in a common allocated NAK time slot for the second nodes. The first node retransmits the data packet to the second nodes based upon receiving the NAK from any second node.

NAKs corresponding to a same data packet are preferably identical and may comprise a pseudo-noise (PN) sequence signal. Use of identical NAKs for all recipients reduces the computational burden placed on the sending node, as it need only attempt to detect the single NAK sequence. PN sequences of subsequent NAKs may be different and/or varied, with the provision that, in each NAK time slot, the PN sequence to be used is the same and is known to all participating nodes. The method may further include measuring propagation delay between the first node and each of the plurality of second nodes to determine the common allocated NAK time slot, or measuring a maximum propagation delay between the first node and the plurality of second nodes to determine the common allocated NAK time slot.

In some applications of the method, NAKs transmitted by multiple recipients may cancel one another if they are transmitted at or near the same power level, and at or near a time difference equal to one half of a cycle of the carrier frequency. To eliminate the risk of such cancellation, second nodes may stagger their transmission of NAKs in time so that NAKs transmitted by different second nodes are received at times differing by at least one symbol period of the PN sequence used to convey the NAK. This is an optional feature that may be unnecessary in many applications of the method, in which variations in frequency, phase, propagation time, etc. make the cancellation described here unlikely to occur.

Each second node may transmit a repeat NAK to the first node in a common allocated repeat-NAK time slot if the second node transmitted the NAK in the allocated NAK time slot or the second node heard a NAK from another of the plurality of second nodes in the allocated NAK time slot. Where necessary to prevent repeat NAKs from canceling one another, the repeat NAKs may be staggered in time in the same manner as the initial NAKs.

The first node and plurality of second nodes define a communication network using an automatic retransmission protocol, such as Automatic Repeat request (ARQ) technique and/or a hybrid-ARQ technique including Forward Error Correction (FEC), for communicating data packets. Furthermore, the method may include storing at least a portion of the data packet received with errors at the second node, and when the retransmitted data packet is also received with errors by the second node, combining the stored portion with the retransmitted data packet to attempt recovery of the data packet.

Objects, features, and advantages in accordance with the present invention are also provided by a communication network including a plurality of wirelessly connected communication nodes including a first node to wirelessly transmit a data packet to second nodes to define a wireless multicast transmission. The second nodes receive data packets from the first node and determine whether a data packet was received with errors and, if so, transmit a negative acknowledgement (NAK) to the first node in a common allocated NAK time slot among the plurality of nodes. The first node then retransmits the data packet when receiving a NAK from any second node of the plurality of nodes.

Again, NAKs corresponding to a same data packet are preferably identical and comprise a pseudo-noise (PN) sequence signal. An error detection unit may vary the PN sequence of subsequent NAKs. A controller may be included to measure propagation delay from the first node to each of the plurality of second nodes to determine the common allocated NAK time slot and/or measure a maximum propagation delay to the plurality of second nodes to determine the common allocated NAK time slot. Different second nodes may stagger their NAK transmissions in time so as to ensure that NAKs transmitted by different second nodes are received by the first node at times differing by at least one symbol period of the PN sequence conveying the NAK. Repeat-NAKs may be transmitted to the first node in a common allocated repeat-NAK time slot if either a NAK was transmitted in the common allocated NAK time slot or if a NAK was heard from another of the plurality of nodes in the common allocated NAK time slot. Where necessary to prevent repeat NAKs from canceling one another, the repeat NAKs may be staggered in time in the same manner as the initial NAKs.

The plurality of nodes preferably use an automatic retransmission protocol such as an Automatic Repeat request (ARQ) technique and/or a hybrid-ARQ technique including Forward Error Correction (FEC). Second nodes may store at least a portion of the data packet received with errors, and combine the stored portion with the retransmitted data packet to attempt recovery of the data packet when the retransmitted data packet is also received with errors.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 1:
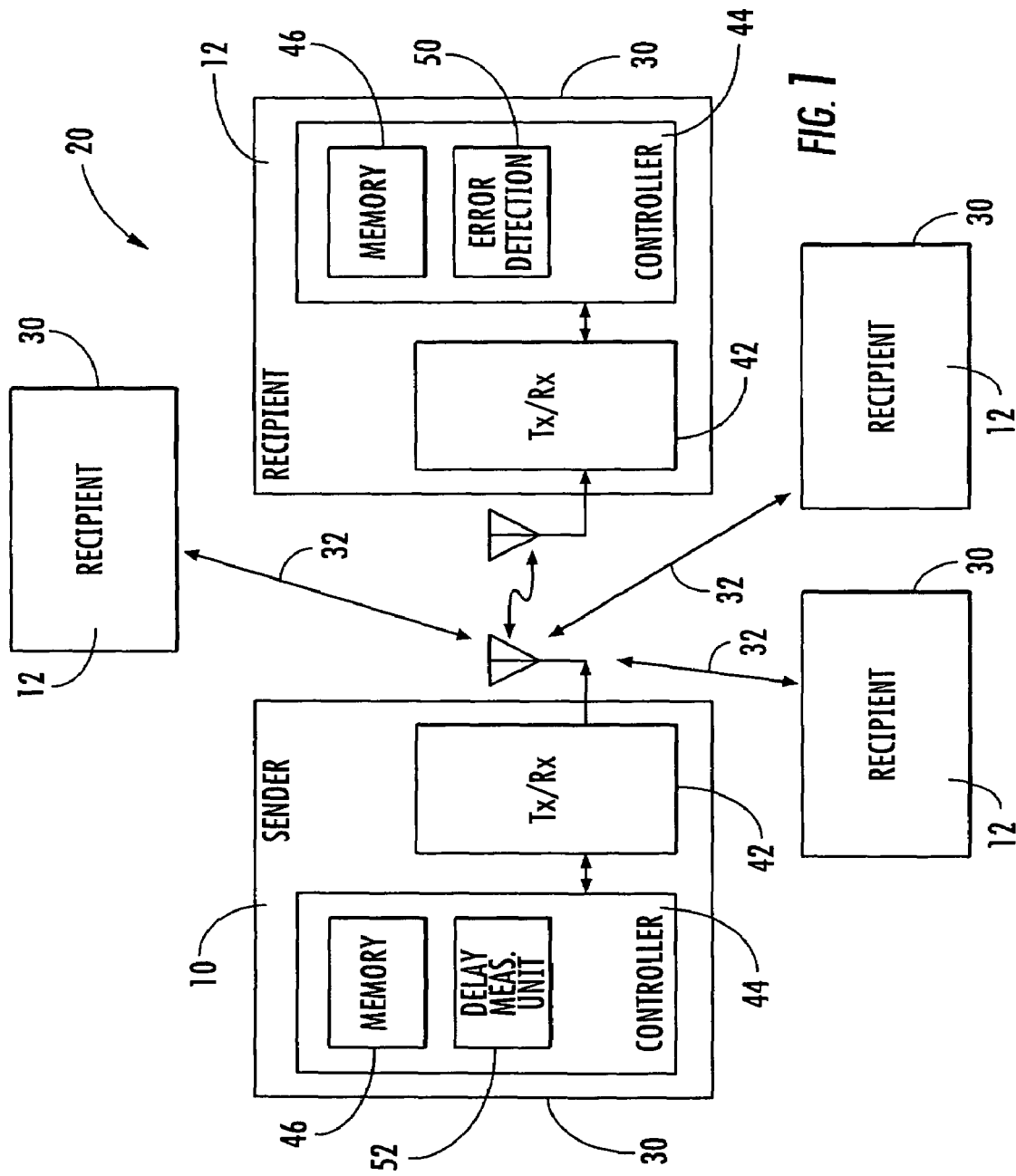
FIG. 1 is a schematic diagram illustrating a wireless multicast communication network and details of sender and recipient mobile node in the wireless multicast communication network in accordance with the present invention.
Figure 2:
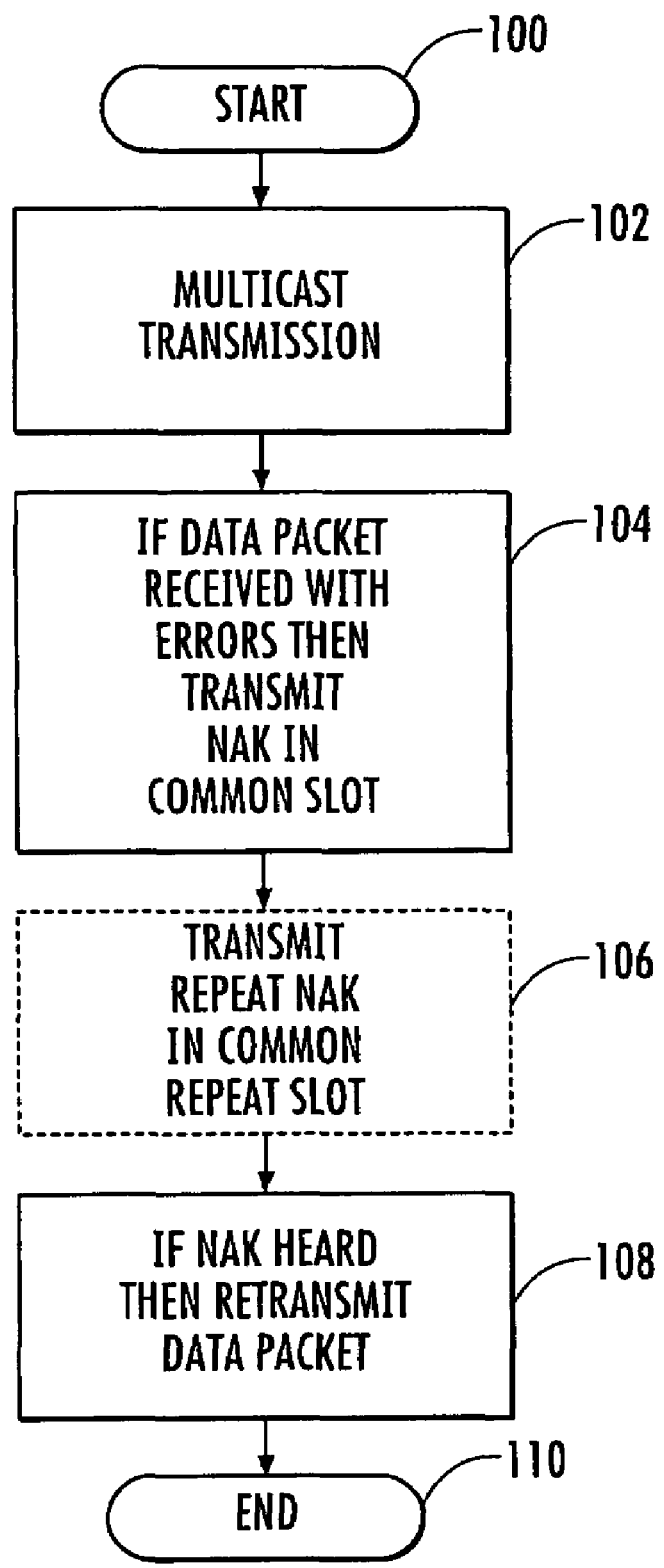
FIG. 2 is a flowchart illustrating the wireless multicast communication method in accordance with the present invention.

Referring initially to FIGS. 1 and 2, a communication method for a wireless multicast communication network 20, such as a High Frequency (HF) radio network, will now be described. The network 20 includes a plurality of wireless, and likely mobile, nodes 30 including the sender or source node 10 and multiple recipient or destination nodes 12 therearound. The nodes 30, such as laptop computers, personal digital assistants (PDAs), radios or mobile phones, are connected by wireless communication links 32 as would be appreciated by the skilled artisan. Of course, various nodes 30 in the network may also be wired and/or stationary. The method begins (block 100) and includes wirelessly transmitting a data packet from the source node 10 or first node to a plurality of destination nodes 12 or second nodes to define a wireless multicast transmission (block 102). At block 104, each second node 12 determines whether the data packet was received with errors and if so transmits a negative acknowledgement (NAK) to the first node 10 in a common allocated NAK time slot for the second nodes. The first node 10 retransmits the data packet to the second nodes 12 based upon receiving the NAK from any second node (block 108).

The first node 10 and plurality of second nodes 12 define a communication network using an automatic retransmission protocol for communicating data packets. The automatic retransmission protocol may be an Automatic Repeat reQuest (ARQ) technique and/or a hybrid-ARQ technique including Forward Error Correction (FEC).

NAKs corresponding to a same data packet are preferably identical and may comprise a pseudo-noise (PN) sequence. For each transmitted packet, all recipients or second nodes 12 transmit NAKs of the packet synchronously, specifically, so that they are received simultaneously at the sending radio or node 10. This greatly reduces the throughput penalty paid for multicast delivery relative to point-to-point delivery. The pseudo-noise modulation format makes the NAKs very robust (so that failure to receive a NAK provides sufficient confidence that the packet was delivered successfully), and permits the simultaneous receipt of NAKs from multiple stations. Multiple NAKs just look like multipath, and actually can further improve the probability of reception.

Figure 3A:
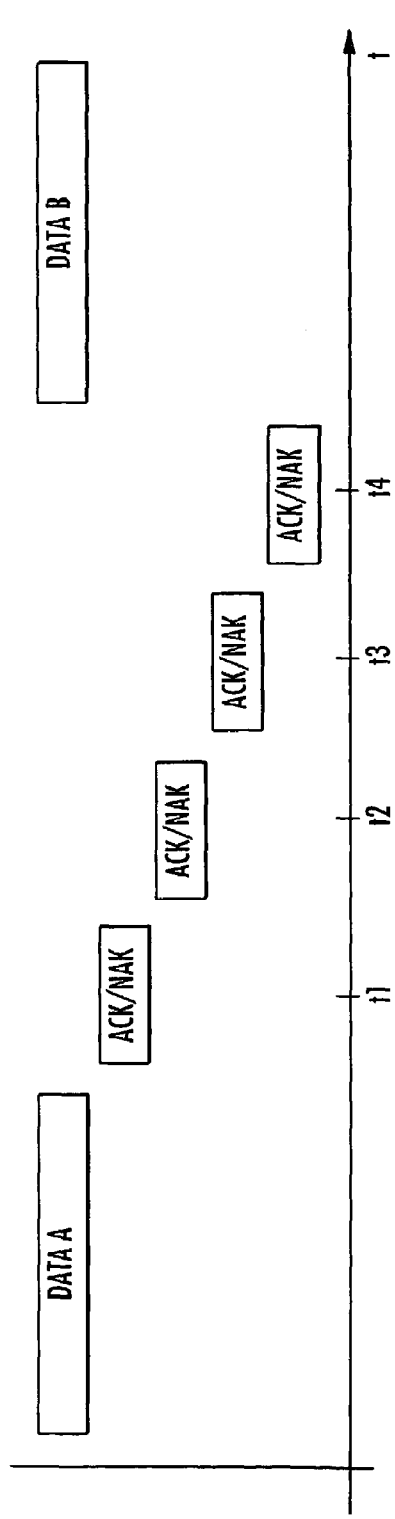
FIGS. 3A and 3B are timing diagrams illustrating multicast ARQ techniques in accordance with the prior art and the present invention, respectively.
Figure 3B:
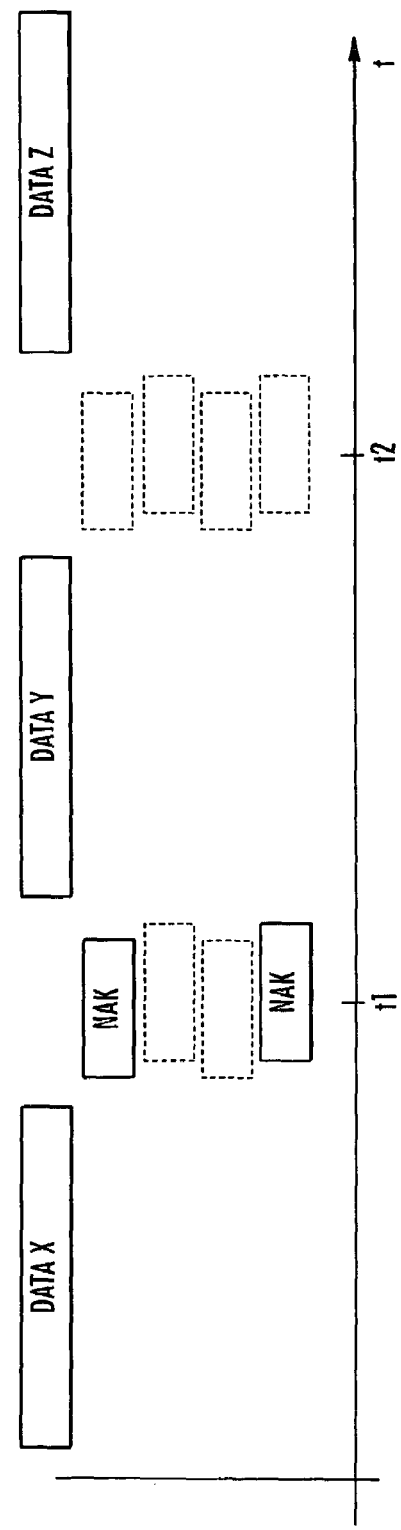

FIGS. 3A and 3B depict the packet and NAK transmission signaling in one embodiment of this approach, and contrast it with the packet and ACK/NAK transmission signaling of the less efficient MIL-STD-188-184 multicast protocol. As such, in the prior art multicast ARQ approach (FIG. 3A), each ACK or NAK is transmitted in its own time slot. However, in the multicast ARQ approach of the present invention (FIG. 3B), only NAKs are used and they are synchronized or transmitted in a common time slot. As shown in the example, two recipients or second nodes 12 send a NAK for Data packet X The sender may select the transmission format for multicast payload data, e.g. orthogonal Walsh, PSK, or QAM, based on real-time channel quality measurements (channel scores). PN sequences used for NAK transmissions may be varied based on TRANSEC key and time of day, to guard against spoofing-based denial-of-service attacks.

As described in the Background section, performance of the HDL and LDL protocols may be enhanced through their use of a hybrid-ARQ (incremental redundancy) technique, in which, as a result of the combining of symbols, it is often possible to recover the transmitted packet without errors. In addition, Harris Corporation of Melbourne, Fla., has developed a data link protocol, HDL+, that achieves still higher point-to-point delivery throughput through the use of highorder signal constellations (QAM-16 and QAM-64), but also uses a form of the Hybrid-ARQ data link technique.

The present invention applies a similar technique to reliable point-to-multipoint data transfer. An embodiment of this invention could extend the LDL and HDL data link protocols of STANAG 4538, and a form of the new HDL+protocol, to provide an efficient multicast ARQ capability that would benefit from the hybrid-ARQ (incremental redundancy) technique used in these protocols.

Multicast protocols based on HDL or HDL+would have multiple data packets per forward transmission. For these protocols, a synchronous multiple-NAK acknowledgement structure (NAK-only) is provided. The NAK sequence depicted in FIG. 4 would replace the single NAK as described above. Following each n-packet forward transmission, recipients are given an n-slot NAK interval providing opportunities to individually NAK each of the packets in the forward transmission that was not received successfully (i.e., was received containing errors) by the recipient. If multiple recipients NAK the same packet, their NAKs are received coinciding or overlapping in time. The duration of each NAK must suffice to account for Transmit Level Control (TLC) and Automatic Gain Control (AGC) settling time in the transmitting and receiving radios, as well as the duration of the PN sequence of PSK symbols with which the NAK is modulated, which must be of sufficient length to be reliably detected. The guard interval must be of sufficient duration to account for multipath spread occurring on the communications channel, as well as for any residual differences in time of receipt of the NAKs by the sending station.

Figure 4:
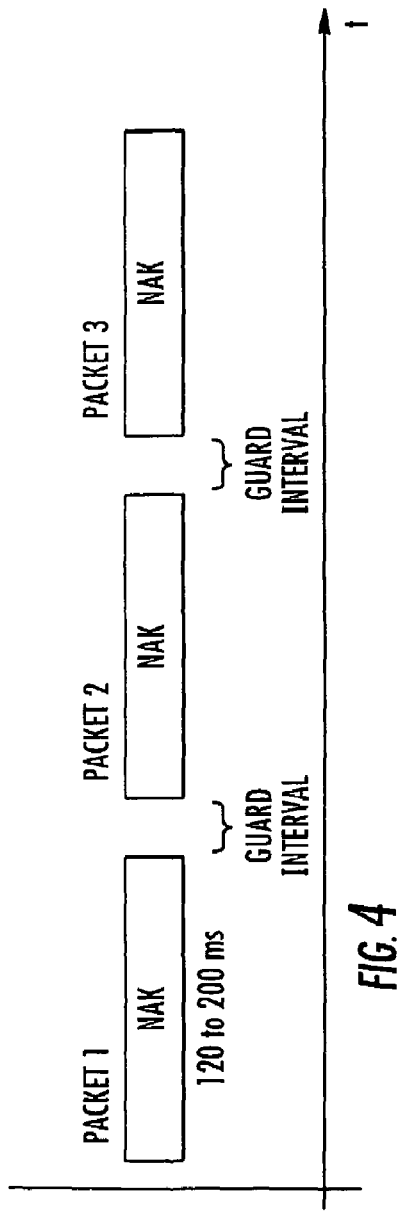
FIG. 4 is a timing diagram illustrating a multicast multi-packet ARQ technique in accordance with the present invention.

A suitable burst format could be one in which a 200 ms PN sequence transmission is used to NAK each packet. The first 80 ms of the sequence may be used to allow for settling time of the TLC and AGC components; the remaining 120 ms of the PN sequence (as a minimum) are available for detection of the NAK transmission by the multicast sender. FIG. 4 depicts one possible multiple-packet acknowledgement structure. In this embodiment of the invention, the 24 packets in a forward transmission would require 24*200 ms or 4.8 seconds for NAKs, providing a gain in efficiency relative to a round-robin ACK procedure whenever the number of recipient nodes multiplied by the required duration of each recipient's ACK time-slot would exceed 4.8 seconds, in a system not using this invention. It is desirable that the packets be relatively long, to reduce the effective NAK overhead. In different applications of the invention, the most desirable transmission durations could vary widely depending on the characteristics of the transmission medium, such as bandwidth, distance or path loss, and communication equipment characteristics such as transmit power or antenna efficiency.

The method may further include measuring propagation delay between the first node 10 and each of the plurality of second nodes 12 to determine the common allocated NAK time slot, or measuring a maximum propagation delay between the first node and the plurality of second nodes to determine the common allocated NAK time slot.

An initial roll-call handshake permits each recipient to measure the sender-to-recipient propagation delay. Based on this measurement, recipients time their transmission of NAKs so that the receipt of the NAKs by the sender is tightly time-synchronized. Fine time-synchronization of the NAKs can improve the time efficiency and reliability of the protocol, especially when a multiple-packet acknowledgement structure is used, but may not be necessary in all applications. A variation of this technique measures only the maximum propagation delay from sender to any recipient. This reduces overhead and may provide sufficiently fine time synchronization of NAKs.

Figure 5:
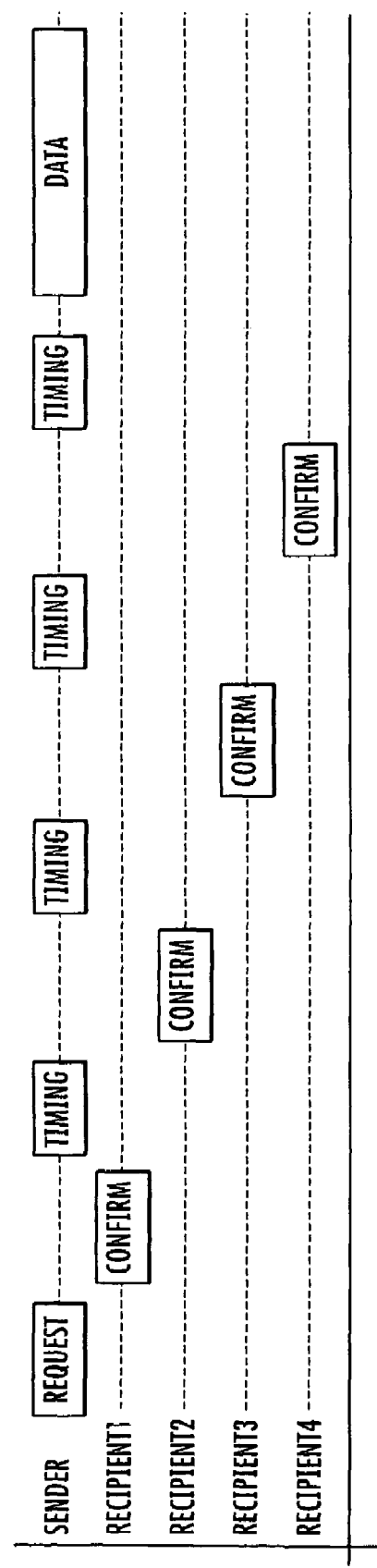
FIG. 5 is a timing diagram illustrating an embodiment of the propagation delay measurement in accordance with the wireless multicast communication method of the present invention.

More specifically, referring to the example illustrated in FIG. 5, to measure propagation delay via roll-call handshake, recipients transmit Confirms in order of address value, based on known protocol addresses of net members. Other approaches may be used to determine the time-slot in which each net member responds. A fixed-length time slot is reserved for each combination of a Confirm Protocol Data Unit (PDU) and a Timing PDU, with guard time allocated to account for maximum propagation delay. Each Confirm PDU is transmitted a fixed time following the receipt of the Request. The nth responder transmits at <Request receipt time>+(n−1) *<slot duration>+<constant PDU encode time>. Each Timing PDU is transmitted a fixed time following the receipt of the Confirm PDU. By receiving the Timing PDU, the recipient can measure the actual propagation delay between it and the sender, and use the known propagation time to transmit its NAKs with correct timing, so that NAKs from all recipients arrive at the sender synchronously. Each Timing PDU is just a PN sequence; its duration is such as to allow it to be detected reliably by the recipient node that transmitted the immediately preceding Confirm PDU.

The variation of this procedure eliminates the need for a Timing PDU following every Confirm PDU. More specifically, response slots are shortened to include only sufficient time for a Confirm PDU. Following the last response slot, a single timing slot is allocated. After all response slots have elapsed, sender transmits a single Timing PDU, at a time determined from the time of arrival of the latest Confirm PDU to arrive at the sender, relative to the start of the response time-slot in which it was transmitted.

By observing the transmissions of the Request PDU and the Timing PDU, recipients are able to measure the maximum propagation delay between the sender and any recipient. Recipients estimate their own propagation delay to the sender to be one half the maximum value. This ensures that, in attempting to receive NAKs, the sender must search (typically through a correlation process) for a NAK PDU over a time-interval equal to no more than the NAK PDU duration plus the maximum actual propagation delay for any recipient plus the maximum accommodated multipath spread.

Relative to the first described procedure, this procedure makes NAK reception somewhat less robust by somewhat extending the correlation time interval. The NAK detection threshold would have to be somewhat higher, to prevent false NAK detections from occurring with excessive frequency. However, for networks spanning relatively small geographic areas (and hence, having small maximum propagation delay), the tradeoff of robustness for reduced overhead may be attractive.

Referring again to FIGS. 1 and 2, each second node 12 may transmit a repeat-NAK to the first node 10 in a common allocated repeat-NAK time slot if the second node transmitted the NAK in the allocated NAK time slot or the second node heard a NAK from another of the plurality of second nodes in the allocated NAK time slot (block 106). The reliability with which the sender receives the NAKs can be improved using this technique. Whenever a node 30 does not have a NAK of its own to transmit, it listens for NAKs from other nodes. An additional 'NAK repeat slot' is provided. In this slot, a node 30 transmits a NAK whenever either of the following is true: the node transmitted a NAK in the original NAK slot; and the node received a NAK from another node in the original NAK slot. In this way, nodes not having NAKs of their own to transmit are enlisted as 'NAK repeaters'. This technique may be desirable in some embodiments of the invention; however, the invention also encompasses embodiments in which this technique is not used.

Furthermore, the method may include storing at least a portion of the data packet received with errors at the second node 12, and when the retransmitted data packet is also received with errors by the second node, combining the stored portion with the retransmitted data packet to attempt recovery of the data packet. In such a hybrid-ARQ (incremental redundancy) technique, if a packet is received with errors, the received channel symbols from receipt of the packet are retained. The receiving station requests retransmission of the corrupted packet, and if the retransmitted packet still contains errors its symbols are combined with those retained from the prior transmission. As a result of the combining of symbols, it is often possible to recover the transmitted packet without errors.

To provide the sender with reliable acknowledgements of receipt of the entire multicast payload by each recipient, the sending and receiving nodes may conduct an optional additional roll-call handshake following the delivery of the multicast payload. In its response time-slot, each recipient would respond with an ACK or NAK indicating whether or not it successfully received the entire multicast payload. This technique may be desirable in some embodiments of the invention; however, the invention also encompasses embodiments in which this technique is not used.

Such roll-call acknowledgement procedure may be desirable in many cases, in view of the following potential situation. A recipient may suffer from a prolonged inability to receive a packet without errors. If this occurs, to avoid precluding successful delivery of the multicast data payload to other recipients, the recipient experiencing this difficulty must cease transmitting NAKs once an upper limit on successive NAK transmissions is reached. Once it does this, the recipient will be unable to receive the multicast payload in its entirety: the packet it had repeatedly NAKed (as a minimum) will be missing from the sequence of packets it receives. Any of a variety of recovery mechanisms can be used to address this situation, as would be appreciated by those skilled in the art.

Referring now again to FIG. 1, a system aspect of the invention will be described. A wireless multicast communications network 20 includes the plurality of mobile nodes 30, and the plurality of wireless communication links 32 connecting the plurality of mobile nodes together. Each mobile node includes a communications device 42, i.e. a transceiver or transmitter and receiver, to wirelessly and uni-directionally or bi-directionally communicate with other nodes via the wireless communication links 32, and a controller 44 to control communications via the communications device 42. Also, a memory 46 may be included as part of the controller 44 or in connection with the controller. The communications device 42 or transmitter wirelessly transmits a data packet to second nodes 12 of the plurality of nodes 30 to define a wireless multicast transmission. The second node 12 receives data packets from a first node 10 of the plurality of nodes 30.

As shown in FIG. 7, the controller 44 of the second node 12 includes an error detection unit 50 which operates in connection with the communications device 42 or receiver to determine whether a data packet was received with errors and, if so, operates in connection with the transmitter to transmit a NAK to the first node 10 in a common allocated NAK time slot among the plurality of nodes 30, as described above. The communications device 42 operates in connection with the controller 44 to retransmit the data packet when receiving a NAK from any second node 12 of the plurality of nodes 30.

Again, NAKs corresponding to a same data packet are preferably identical and comprise a pseudo-noise (PN) sequence. The error detection unit 50 may vary the PN sequence of subsequent NAKs. The controller 44 of the first node 10 may include a delay measurement unit 52 to measure propagation delay to each of the plurality of second nodes 12 to determine the common allocated NAK time slot and/or measure a maximum propagation delay to the plurality of second nodes to determine the common allocated NAK time slot.

The error detection unit 50 may operate in connection with the transmitter to transmit a repeat NAK to the first node 10 in a common allocated repeat NAK time slot if a NAK was transmitted in the common allocated NAK time slot or if a NAK was heard from another of the plurality of nodes 30 in the common allocated NAK time slot.

The memory 46 may be operated in a hybrid-ARQ technique with incremental redundancy to store at least a portion of the data packet received with errors, and the error detection unit 50 may operate in connection with the memory to combine the stored portion with the retransmitted data packet to attempt recovery of the data packet when the retransmitted data packet is also received with errors. The error detection unit 50 and the propagation delay measurement unit 52 have been illustrated in the second node 12 and the first node 10, respectively. However, as would be appreciated by those skilled in the art, each of the plurality of nodes 30 may include a controller 44 having each of these features.

This invention describes methods and networks for highly efficient multicast (one sender to multiple recipients) data delivery over wireless media, such as HF radio, through use of some or all of the following techniques: Hybrid-Arq multicast data link protocol with incremental redundancy; Selection of delivery modulation format (e.g. orthogonal Walsh modulation, PSK, or QAM) based on real-time channel quality measurement; As delivery proceeds, recipients transmit only negative acknowledgments (NAKs, signifying that a packet was received containing errors); Negative acknowledgments are transmitted in a time-synchronized manner, eliminating the additional overhead required if each recipient had its own response time slot; before delivery of data, sender and recipients conduct a roll-call handshake to measure propagation delays and permit fine time-synchronization of NAKs; and where needed to improve reliability of NAKs, NAK time slots are paired, and every recipient node that receives a NAK in the first time slot retransmits it in the second.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communication method comprising:
    wirelessly transmitting a data packet from a first node to a plurality of second nodes defining a wireless multicast transmission;
    at each second node determining whether the data packet was received with errors and if so, respectively and synchronously transmitting a negative acknowledgement (NAK) to the first node in a common allocated NAK time slot for the second nodes so that the NAKs are received concurrently at the first node, wherein NAKs corresponding to a same data packet are the same and each of the NAKs comprises a pseudo-noise (PN) sequence signal; and
    at the first node retransmitting the data packet to the second nodes based upon receiving the NAK from any second node;
    wherein transmitting a NAK further comprises different second nodes staggering their respective NAK transmissions so as to ensure that the respective NAKs are received by the first node within the common allocated NAK time slot but at times differing by at least one symbol period of the PN sequence signal to prevent the respective NAKs from canceling each other.

2. The communication method of claim 1 wherein the PN sequence of subsequent NAKs is different.

3. The communication method of claim 1 further comprising measuring propagation delay between the first node and each of the plurality of second nodes to determine the common allocated NAK time slot.

4. The communication method of claim 1 further comprising measuring a maximum propagation delay between the first node and the plurality of second nodes to determine the common allocated NAK time slot.

5. The communication method of claim 1 further comprising each second node transmitting a repeat-NAK to the first node in a common allocated repeat-NAK time slot if the respective second node transmitted the NAK in the common allocated NAK time slot or the respective second node heard a NAK from another of the plurality of second nodes in the common allocated NAK time slot.

6. The communication method of claim 1 wherein the first node and plurality of second nodes define a communication network using an automatic retransmission protocol for communicating data packets.

7. The communication method of claim 6 wherein the automatic retransmission protocol comprises an Automatic Repeat reQuest (ARQ) technique.

8. The communication method of claim 7 wherein the ARQ technique comprises a hybrid-ARQ technique including Forward Error Correction (FEC).

9. The communication method of claim 1 further comprising:
    storing at least a portion of the data packet received with errors at the second node; and
    when the retransmitted data packet is also received with errors by the second node, combining the stored portion with the retransmitted data packet to attempt recovery of the data packet.

10. A communication network comprising:
    a plurality of wirelessly connected communication nodes including a first node and a plurality of second nodes;
    the first node wirelessly transmitting a data packet to the plurality of second nodes to define a wireless multicast transmission;
    each of the plurality of second nodes receiving the data packet from the first node, and determining whether the data packet was received with errors and, if so, respectively and synchronously transmitting a negative acknowledgement (NAK) to the first node in a common allocated NAK time slot among the plurality of nodes so that the NAKs are received concurrently at the first node, wherein NAKs corresponding to a same data packet are the same, and each of the NAKs comprises a pseudo-noise (PN) sequence signal; and the transmitter retransmitting the data packet when receiving a NAK from any second node of the plurality of nodes;

wherein the second nodes stagger their respective NAK transmissions so as to ensure that the respective NAKs are received by the first node within the common allocated NAK time slot but at times differing by at least one symbol period of the PN sequence signal to prevent the respective NAKs from canceling each other.

11. The communication network of claim 10 wherein the second node varies the EN sequence signal of subsequent NAKs.

12. The communication network of claim 10 wherein the first and second nodes measure propagation delay from the first node to each of the plurality of second nodes to determine the common allocated NAK time slot.

13. The communication network of claim 10 wherein the first and second nodes measure a maximum propagation delay to the plurality of second nodes to determine the common allocated NAK time slot.

14. The communication network of claim 10 wherein each of the second nodes transmits a repeat NAK to the first node in a common allocated repeat NAK time slot if either a NAK was transmitted in the common allocated NAK time slot or if a NAK was heard from another of the second nodes in the common allocated NAK time slot.

15. The communication network of claim 10 wherein the plurality of nodes use a NAK-only hybrid-ARQ technique including Forward Error Correction (FEC).

16. The communication network of claim 10 wherein each second node stores at least a portion of the data packet received with errors, and combines the stored portion with the retransmitted data packet to attempt recovery of the data packet when the retransmitted data packet is also received with errors.

17. A communication network comprising:
a plurality of wirelessly connected communication nodes, each node comprising
a transmitter to wirelessly transmit a data packet to second nodes of the plurality of nodes to define a wireless multicast transmission,
a receiver to receive data packets from a first node of the plurality of nodes, and
an error detection unit operating in connection with the receiver to determine whether a data packet was received with errors and, if so, operating in connection with the transmitter to synchronously transmit a negative acknowledgement (NAK) to the first node in a common allocated NAK time slot among the plurality of nodes so that the NAKs are received concurrently at the first node, wherein NAKs corresponding to a same data packet are the same, and each of the NAKs comprises a pseudo-noise (PN) sequence signal, and
the transmitter operating in connection with the receiver to retransmit the data packet when receiving a NAK from any second node of the plurality of nodes;

wherein the transmitters of the second nodes stagger their respective NAK transmissions so as to ensure that the respective NAKs are received by the first node within the common allocated NAK time slot but at times differing by at least one symbol period of the PN sequence signal to prevent the respective NAKs from canceling each other.

18. The communication network of claim 17 wherein each node further comprises a controller to measure propagation delay to each of the plurality of second nodes to determine the common allocated NAK time slot.

19. The communication network of claim 17 wherein each node further comprises a controller to measure a maximum propagation delay to the plurality of second nodes to determine the common allocated NAK time slot.

20. The communication network of claim 17 wherein the error detection unit operating in connection with the transmitter transmits a repeat NAK to the first node in a common allocated repeat NAK time slot if either a NAK was transmitted in the common allocated NAK time slot or if a NAK was heard from another of the plurality of nodes in the common allocated NAK time slot.

21. The communication network of claim 17 wherein each node further comprises a memory to store at least a portion of the data packet received with errors; and wherein the error detection unit operating in connection with the memory combines the stored portion with the retransmitted data packet to attempt recovery of the data packet when the retransmitted data packet is also received with errors.

* * * * *